United States Patent
Gonzalez et al.

(10) Patent No.: US 9,501,658 B1
(45) Date of Patent: Nov. 22, 2016

(54) AVOIDING FILE CONTENT READING USING MACHINE INFORMATION

(71) Applicant: International Business Machines Corporation, Armonk, NY (US)

(72) Inventors: Pablo Roberto Millicay Gonzalez, São Paulo (BR); Tiago Pagani, São Paulo (BR); Krzysztof A. Rudek, Nowy Wisnicz (PL); Vinod A. Valecha, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/991,316

(22) Filed: Jan. 8, 2016

(51) Int. Cl.
G06F 21/62 (2013.01)

(52) U.S. Cl.
CPC ....... *G06F 21/6218* (2013.01); *G06F 21/6209* (2013.01)

(58) Field of Classification Search
None
See application file for complete search history.

(56) References Cited

U.S. PATENT DOCUMENTS

| | | | | |
|---|---|---|---|---|
| 6,763,464 | B2 * | 7/2004 | Wang | G06F 21/10 380/201 |
| 8,799,334 | B1 | 8/2014 | Stefanov et al. | |
| 2007/0203988 | A1 | 8/2007 | Lee et al. | |
| 2014/0013111 | A1 | 1/2014 | Herbach et al. | |
| 2014/0201526 | A1 * | 7/2014 | Burgess | G06F 21/316 713/165 |
| 2015/0007264 | A1 | 1/2015 | Maldaner | |
| 2015/0026460 | A1 | 1/2015 | Walton et al. | |
| 2015/0033027 | A1 | 1/2015 | Miller et al. | |
| 2015/0040180 | A1 | 2/2015 | Jacobson et al. | |

FOREIGN PATENT DOCUMENTS

| | | |
|---|---|---|
| GB | 2505375 A | 2/2014 |
| WO | WO 2014/201801 A1 | 12/2014 |

OTHER PUBLICATIONS

Bhoyar, "To Changing the Storage System Mechanism for Critical Areas of Focus in Cloud Computing", International Conference on Artificial Intelligence, Energy and Manufacturing Engineering (ICAEME'2014), Jun. 9-10, 2014, Kuala Lumpur (Malaysia), pp. 11-15.

* cited by examiner

*Primary Examiner* — Minh Dinh
(74) *Attorney, Agent, or Firm* — Scully, Scott, Murphy & Presser, P.C.; Ronald A. Kaschak

(57) ABSTRACT

A method, system and computer program product for protecting access to a computer file are disclosed. In embodiments, the method comprises a user, employing a user computer, selecting a file, and creating a reference file to protect access to this selected file. When a requester uses a computer device to request access to the protected file, the reference file initiates a procedure to determine if the computing device is entitled to access the protected file by validating a series of computer components that uniquely identify the computing device. In embodiments, a set of specified computer configuration data is stored in a specified storage location; and the series of computer components that uniquely identify the computing device are validated by comparing this set of computer configuration data with the series of computer components that uniquely identify the computing device.

9 Claims, 5 Drawing Sheets

AVOIDING FILE CONTENT READING USING MACHINE INFORMATION

BACKGROUND

This invention generally relates to controlling access to files. More specifically, embodiments of the invention relate to assuring data privacy and to secure sharing across different devices.

Today, most people have sensitive data on their computers that should not be opened by unauthorized people. Even with known methods to protect data, data on a computer can be stolen in many ways by an unauthorized person improperly accessing the computer directly or remotely.

Despite the variety of methods for protecting or encrypting sensitive data, these solutions have important disadvantages or limitations. For example, a file stolen from a storage may often be easily opened on any machine by any person, and the file security is lost. Protection based on encryption may be lost if an unauthorized person, e.g., a hacker, obtains the decryption key.

SUMMARY

Embodiments of the invention provide a method, system and computer program product for protecting access to a computer file. In embodiments, the method comprises a user, employing a user computer, selecting a file on the user computer to be protected; and protecting access to the selected file. Protecting access to the selected file includes creating a reference file for the protected file; and using the reference file to control access to the protected file, including, when a requester uses a computer device to request access to the protected file, the reference file initiating a procedure to determine if the computing device is entitled to access the protected file by validating a series of computer components that uniquely identify the computing device.

In embodiments, the protecting access to the selected file includes storing a set of specified computer configuration data is a specified storage location; and the validating the series of computer components that uniquely identify the computing device includes comparing said set of specified computer configuration data with the series of computer components that uniquely identify the computing device.

In embodiments, the specified storage location is a data storage device remote from the user computer.

In embodiments, the set of specified configuration data identifies only the user computer, whereby access is granted to the protected file only when the attempt to access the protected file comes from the user computer.

In embodiments, the set of specified configuration data identifies a set of computers, whereby access to the protected file is granted when the attempt to access the protected file comes from any computer of, and only computers of, said set of computers.

In embodiments, the set of specified computer configuration data includes hardware configuration data and software configuration data.

In embodiments, the protecting access to the selected file includes storing the selected file in a specified location on the user computer.

In embodiments, the user computer has an operating system, and the protecting the selected file includes encapsulating the protected file on the user computer to restrict access to the protected file from said operating system.

In embodiments, the using the reference file to control access to the protected file includes giving the requester access to the protected file only when the reference file initiating the procedure to determine if the computing device is entitled to access the protected file by validating the series of computer components that uniquely identify the computing device.

In embodiments, when said procedure determines that the computing device is not entitled to access the protected file, requesting that said person provide a defined security token to have access granted to the protected file.

Embodiments of the invention provide a method and system in which files can be protected from non-authorized users by storing and linking computer-specific related information to a file, assuring that this data will only be accessible from the owner's computer or from devices with access granted by this owner. An administrative panel is available for users to select the files they want to protect. The selected files are hidden from the Operating System of the computer and stored internally into the protection system to be accessed only from the device where the selected files were originally protected or from any device authorized by the owner.

Embodiments of the invention provide a cloud-based method and system that verifies hardware and software information specific to a computer and only allows the file to be accessed if a request for access passes some validations testes, such as MAC Address, hardware items, IP address (to get the location) and Operating System information. The system may cross reference some or all of this information in order to uniquely identify the computer which has access granted to the file.

Embodiments of the invention create a reference file which represents protected data, which are encrypted and hidden. Access control is done via the reference file which checks if the device trying to access a protected file is entitled to do so, by validating a series of hardware and software components that uniquely identify that computer.

In embodiments of the invention, when a requester requests access to the protected file, the protected file calls the reference file, and the reference file invokes the method to determine if the request for access is from an authorized device. If the request is authorized, the reference file sends a message to the protected file indicating that the requested access can be given.

In embodiments of the invention, the protected file is only accessed once the computer credentials are verified, therefore before this process is complete, the protected data are totally inaccessible. The reference file contains the method to call the Web Service hosted in the cloud in order to verify if the requesting source is authorized to access the protected file.

Embodiments of the invention provide a number of important advantages. For instance, with embodiments of the invention, the file is protected and can only be accessed from authorized devices, and the owner of the file decides who can access the files. Further, even if the file is stolen, the file content is not accessible from non-authorized devices. Also, the user does not need programming skills to use the file protection application of embodiments of the invention.

DETAILED DESCRIPTION

Figure 1:
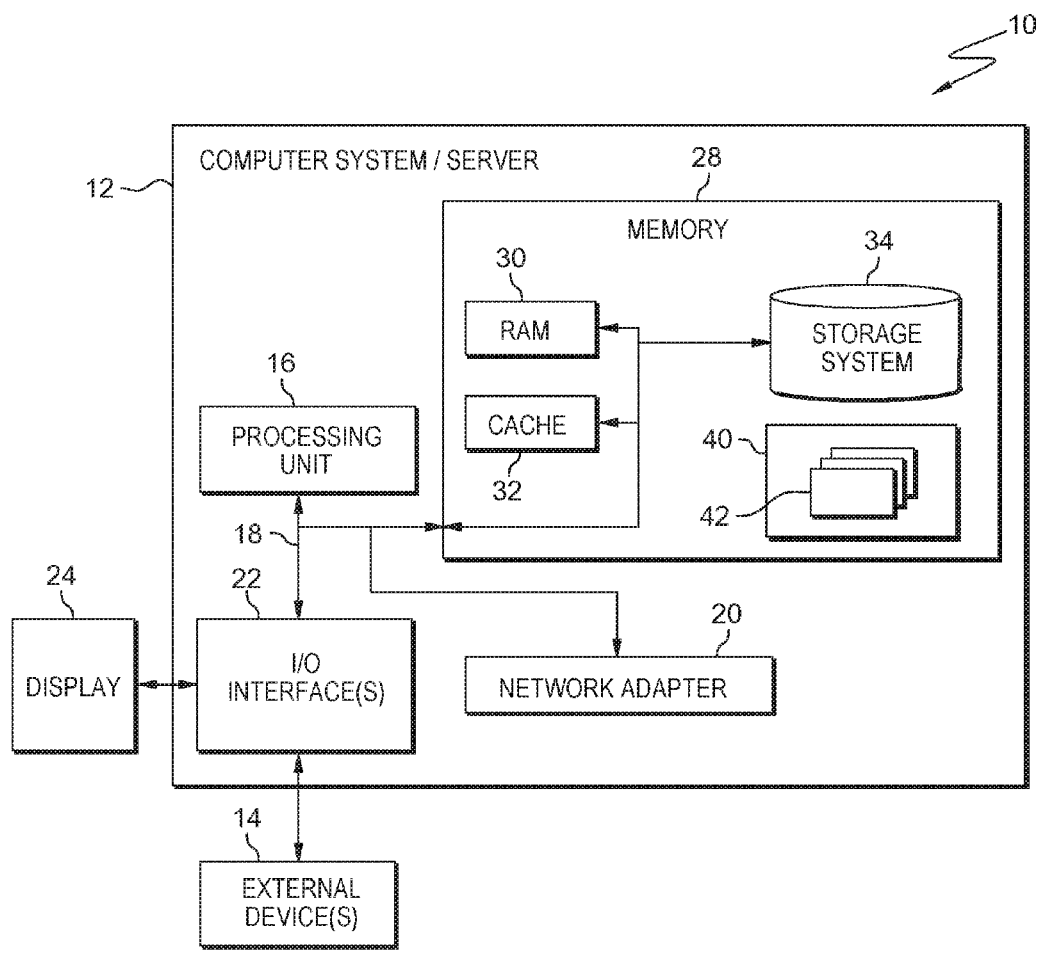
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
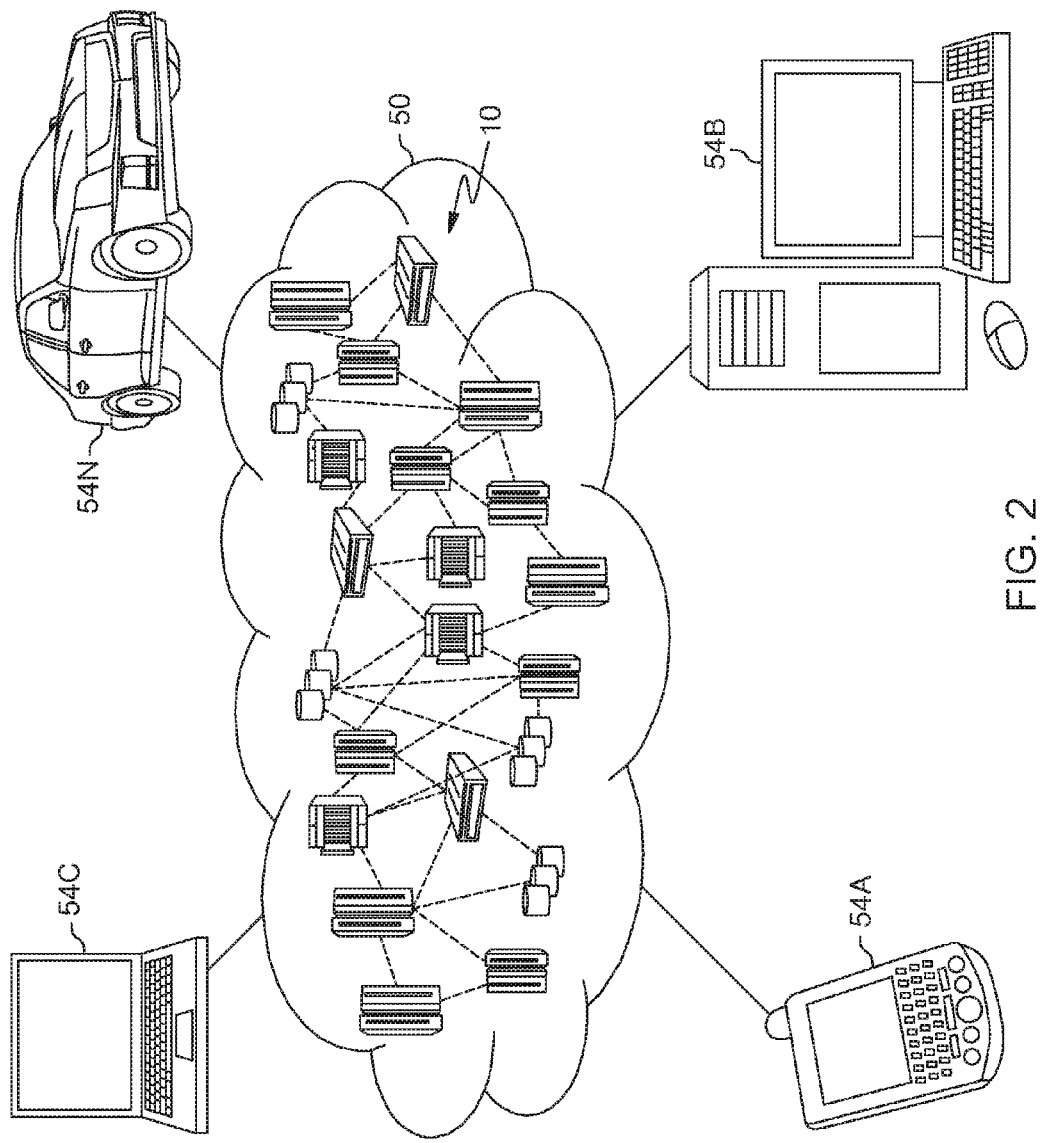
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
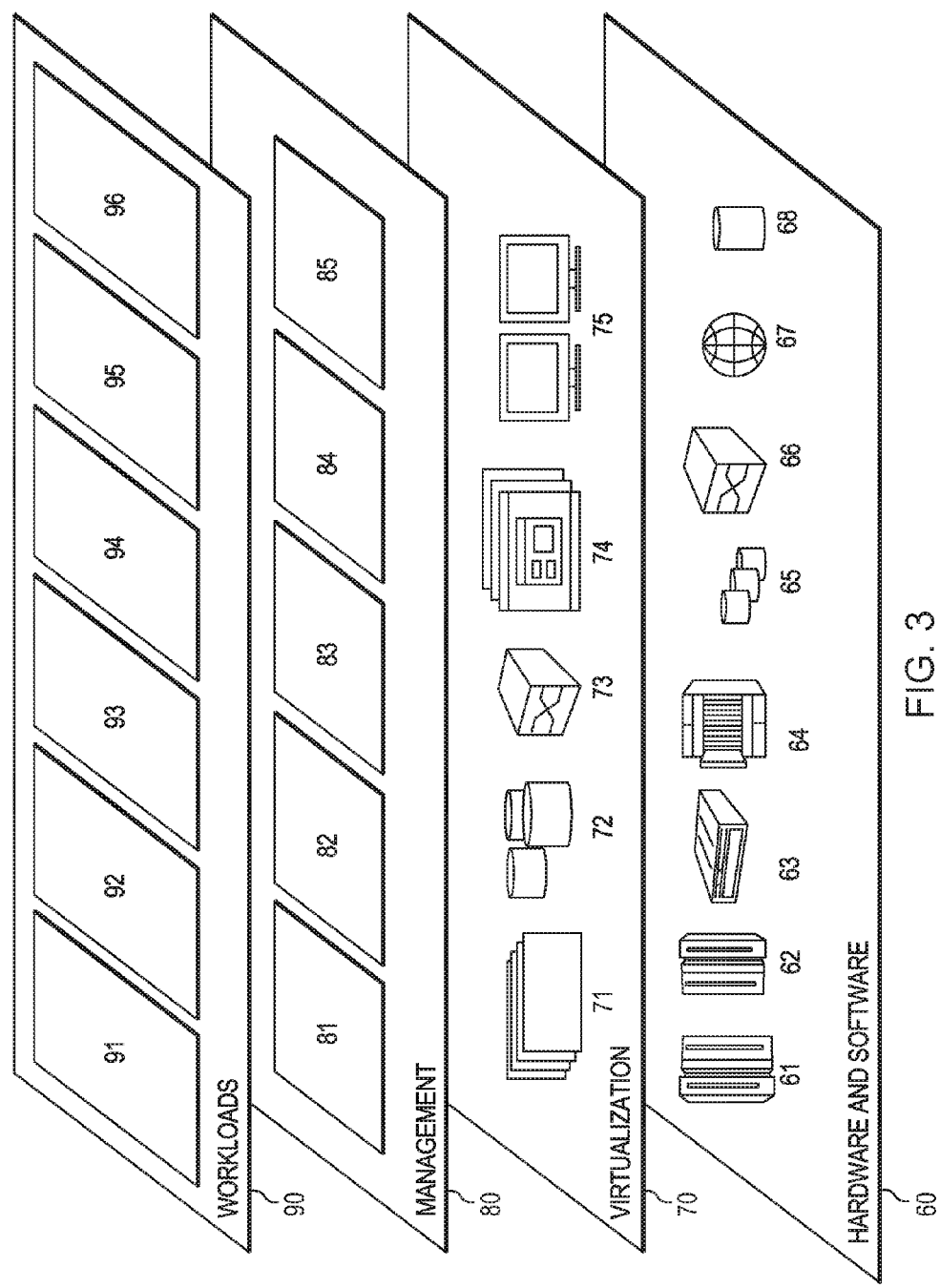
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto.

As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and avoiding file content reading using machine's information 96.

Embodiments of the invention provide a cloud-based method and system that verifies hardware and software information specific to a computer and only allows the file to be accessed if a request for access passes some validations tests, such as MAC Address, items, IP address (to get the location) and Operating System information. The system may cross check some or all of this information in order to uniquely identify the computer which has access granted to the file.

Figure 4:
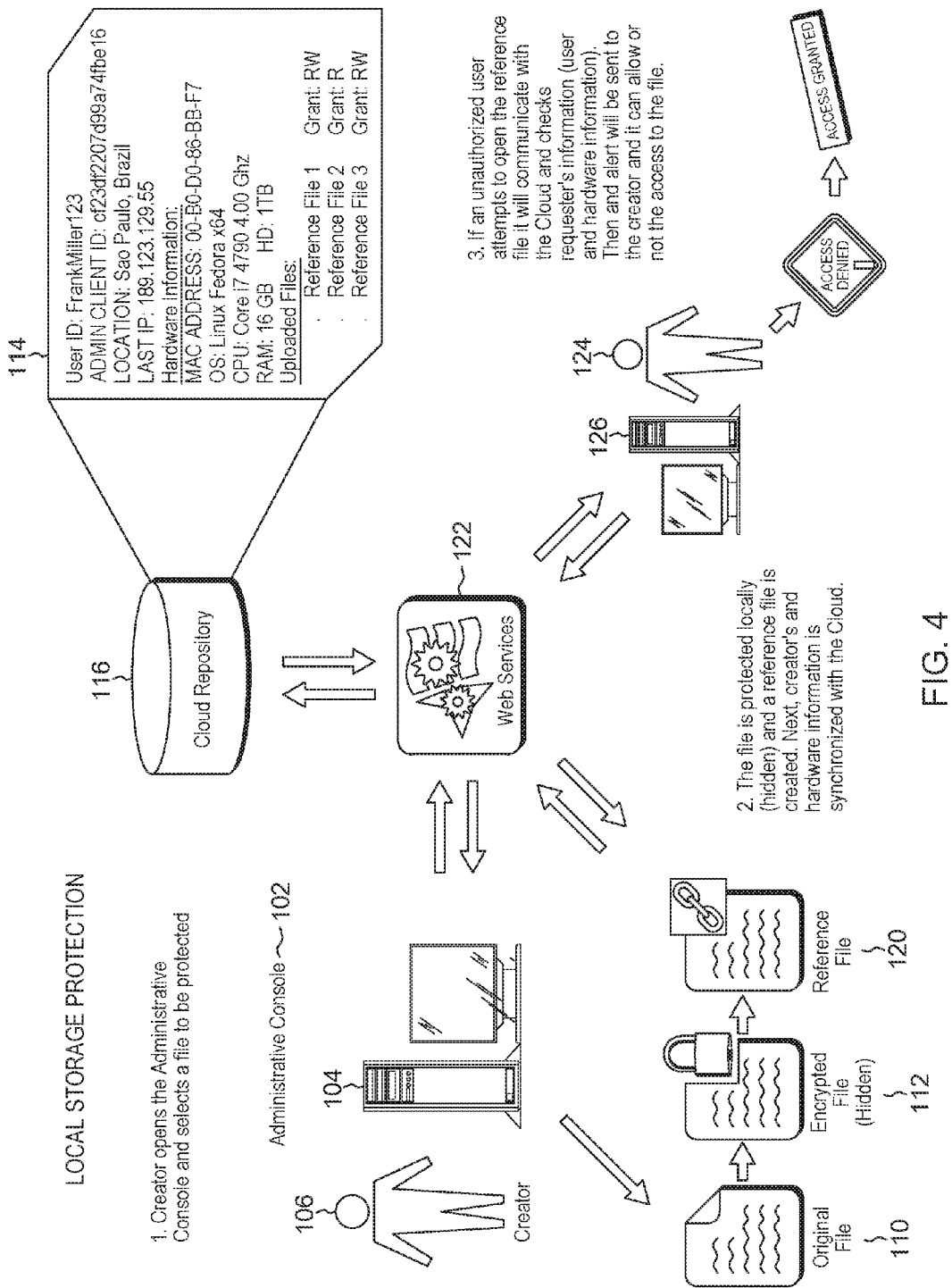
FIG. 4 illustrates an embodiment of the invention that provides local storage protection.

FIG. 4 illustrates a method and system in accordance with an embodiment of the invention. The system provides an administrative console 102 operating on computer 104 so the user 106 can browse the files and select the ones 110 he wants to protect. Once the files are selected, they are encrypted 112 and an entry 114 is created in the Cloud 116 to store the computer related data such as hardware items, MAC address, IP (in order to determine the user's location) and Operating System information to uniquely identify that computer 104, and a reference file 120 is generated containing a method which invokes a Web Service 122 hosted in the Cloud 116 to check for this information.

In the administrative console, the user can specify a security level for each file. These security levels can control both local access (from the computer 104 where the file is located), and remote access (file sharing). For example, the security levels for local access can include full access and read only mode. With full access, the file is fully accessible from the owner's computer and authorized devices only. In the read only mode, the files can be viewed but not edited nor copied to any other location. As another level of access, the file is accessible only by providing username and password every time to prevent unauthorized users that might have access to an authorized machine/device.

To allow remote access, the file owner 106 can send the reference file corresponding to protected data to another user 124 that the file owner wants to share the file with. With the reference file, an authorized user can access the original file content vie Cloud storage 116. When a person 124 receives the file and tries to open the file for the first time, a prompt is shown asking for a token to grant access to this user. This token is only generated via the administrative console 102 from the file owner's 106 computer/device 104.

The embodiment of FIG. 4 provides local storage protection. The user 106 opens the Administrative Console 102 and selects the files 110 he wants to protect. For each file selected, the original file is encrypted 112 and hidden in Operating System level, a reference file 120 is generated and an entry is created in the Cloud 116 to store hardware configuration items, operating system information, mac address and ip address to uniquely identify that computer. The hiding of the protected file is done at the operating system level, and any suitable available hiding mechanism can be used to do this hiding. The purpose of the hiding is to hide the protected file from an invalid user on the operating system, to avoid access to an unauthorized user to the protected file. Additionally, the user can assign a password to this file for a higher level security.

The user then defines the access level to that file. If the user is sure that he is the only person who accesses the computer, he can specify a lower level security, which includes hardware, MAC and IP addresses and Operating System verification so this file can be easily accessed from his computer without being prompted to provide user credentials every time the file is accessed. By specifying this security level, if the file is stolen from his computer, the file cannot be accessed from any other computer as any request to access the file will fail the hardware and Operating System validations.

The reference file contains information such as hardware configuration items, operating system information, mac address and ip address to uniquely identify a computer. With the reference file, an authorized user can access the original file content via Cloud storage. Any request for access to the protected file requires data from the reference file. Thus, when the request is made to the protected file, the protected file checks for the data in the reference file. Even if the protected file is stolen, the thief would not have access to the reference file and thus would not be able to decrypt the encrypted protected file.

The reference file contains a method that invokes a Web Service 122 hosted in the Cloud that checks the hardware and software of each computer accessing the reference file.

If the reference file verifies that the computer 126 accessing the reference file is the computer where the file was created, then the access is granted locally to the original file 110. However, in case the verification method identifies that the computer accessing the file is not the authorized computer, a security token is required to access the file, and this token can only be generated from the administrative console from where the file was created. An alert is sent to the creator of the file to inform him that someone is trying to access the file.

The security token can be generated from the Administrative Console 102 in case the user wants to share the file with another user or have the file accessible from another computer.

If the user specifies read only mode, the file can be accessible from the local computer, but cannot be edited (in the case of a text, spreadsheet or other documents) and cannot be copied or moved to another location.

If the file was marked to be accessible only by providing username and password, nothing can be done with the file unless the credentials are confirmed for each action (open, save, move, coy, etc.).

Generally, with the method illustrated in FIG. 4, the user open the Administrative Console and selects a file to be protected, hardware and software details captured from the computer are stored in the Cloud storage system, and a reference file is created. This reference file can invoke a remote method to verify if any computer trying to access the protected file is authorized to do so.

Figure 5:
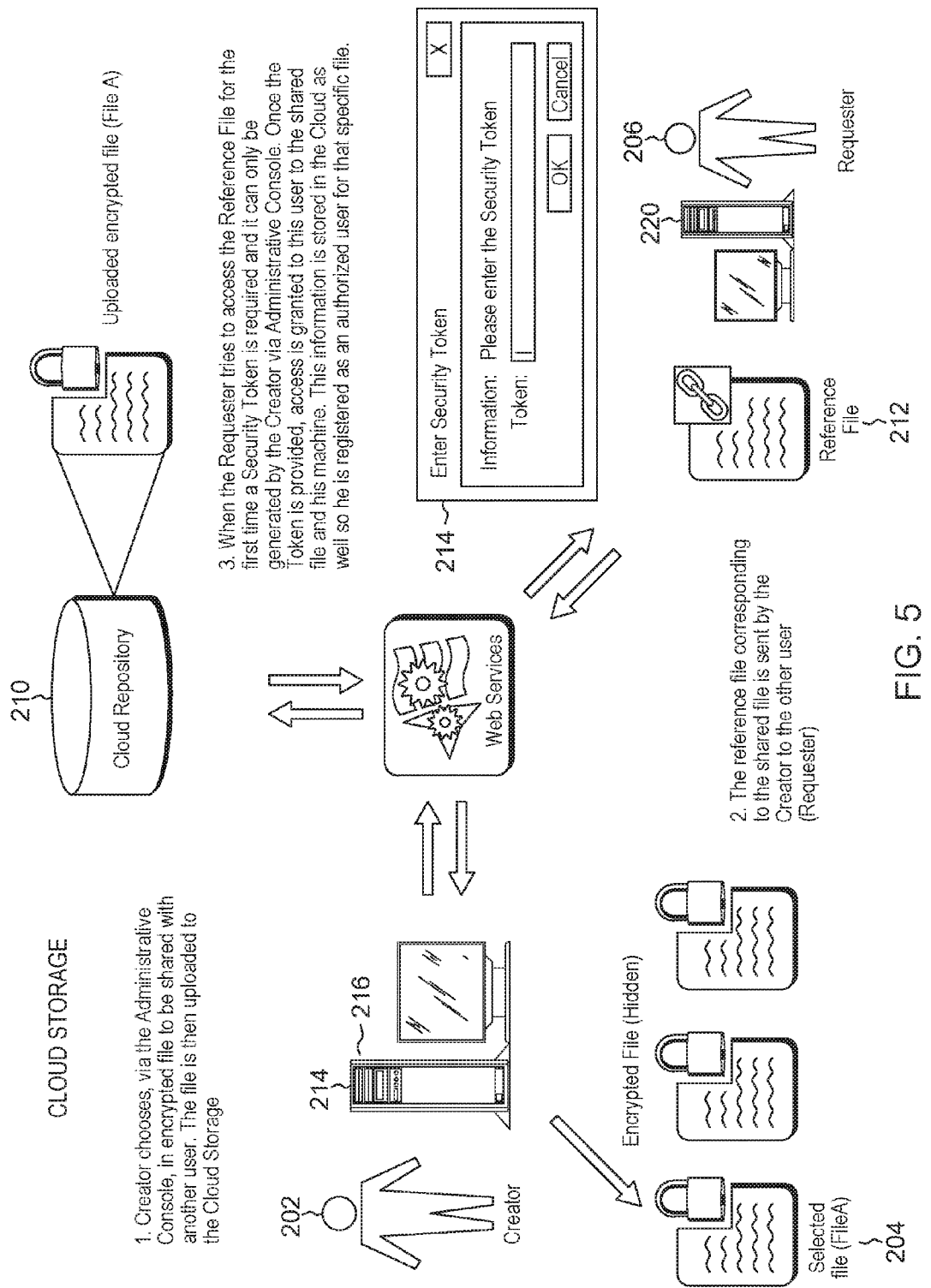
FIG. 5 shows an embodiment of the invention that provides storage protection in a cloud sharing environment.

FIG. 5 shows a method and system in accordance with another embodiment of the invention. This embodiment provides secure file sharing via Cloud computing. In case the user 202 wants to share a secure file 204 with another person 206, this can be done via Cloud 210. The reference file 212 (which references the original file) contains a Web Service method which checks entries in Cloud storage 210 for all the devices certified to have access to the file. The user needs to enable sharing options to the file via Administrative console

214. Once this is done, the protected file 204 is automatically uploaded to the Cloud 210. The user 202 then can send the reference file 212 to any other user he wants to share the file 204 with. When the other user 206 first attempts to access the file, a prompt 214 is shown to this other user to request a security token. This security token is only generated from the Administrative Console installed in the computer 216 where the file was created.

The creator of the file receives a notification about this other user and specifications of the machine 220 of the other person trying to access the file. If the creator 202 wants to grant privileges to this other person, the file creator will then need to generate the security token from the Administrative Console 214 and share it with the other user. Once the other user 206 inputs this information, his hardware and Operating System details are captured and stored in the Cloud 210, to assure that he is now an authorized user.

The access level of this user 206 depends on the file creator's preference. The access, for example, can be read only, full access without sharing, or full access with sharing options. With read only access, the user can see the file but not edit it. With full access without sharing, the user can edit the document but cannot share the document with other users. With full access with sharing options, the user can edit the document and share the document with others. In addition, for all these options, there is an alternative "Time limited option", which is the same as the original option but for a limited time specified by the file creator.

Generally, with the method illustrated in FIG. 5, the user 202 who protected the file 204 shares the reference file 212 with another user 206, and this other user tries to access the protected file (remote access via the Cloud). This other user is not yet authorized to access the file, and therefore a prompt 214 is shown to this user to request a security token. The creator of the file provides the other user with the security token, this other user inputs this information and is granted access to the protected file, and hardware and software information about the computer or computing device 220 used by this other user 206 is stored in the Cloud to enable him as an authenticated user.

Embodiments of the invention create a reference file which represents protected data, which is encrypted and hidden. The access control is done via the reference file which checks if a device trying to access the protected file is entitled to do so, by validating a series of hardware and software components that uniquely identify that device. The access restrictions can be applied locally as well, and the reference file allows easy and dynamic content sharing via the Cloud, as long as the owner of the protected files shares the security token that can be generated via Administrative Console and is used to authorize a different device.

Even behind an NAT Server, embodiments of the invention work in a similar way. Behind these servers, all the packages sent contain the global router IP (External IP) and in the source port, a number which was generated by NAT to identify this computer under the internal network. In that case, it does not matter whether the IP is dynamic or not, or even if the device is under an NAT Server. The goal is to have a reference of the source location with this information, and not using this information as a parameter that should precisely identify the device under an internal network. This way, this information can be stored in the administrative console and in the Cloud and would work as if it was a regular IP address.

Even though IP and MAC addresses can be cloned, they are just two of the parameters used to uniquely identify the computers, they are only part of the "key," and a user who tries to steal or have unauthorized access to the files would need to know the MAC address and IP of the computes allowed to access the files in order to clone this information, and again, the MAC address and the IP of the computer are only part of the key.

In embodiments of the invention, the reference file contains information such as hardware configuration items, operating system information, mac address, and op address to uniquely identify a computer. With the reference file, an authorized user can access the original file content via cloud storage.

Any request for the access to the protected file requires data from the referenced file. Thus, when the request is made to the protected file, the protected file checks for the data in the referenced file. Even if the protected file is stolen, the thief would not have access to the reference file and thus would not be able to decrypt the encrypted protected file.

In embodiments of the invention, the protected file checks with the reference file if the access should be granted. There is a mapping between the protected file and the reference file. The protected file can have a file attribute that indicates the reference file.

In embodiments of the invention, the reference file contains a method that checks the hardware and software of each computer accessing the protected file. This method may be, for example, a method invocation using RMI, or web service, etc. There is communication that is happening between the reference file and the protected file that decides on the access. This communication can be through a remote method call, as an example.

In embodiments of the invention, the reference file contains a method which invokes a web services hosted in the cloud. The web service is hosted in the cloud, and the invocation of the web service happens from the reference file.

In embodiments of the invention, the protected file should only be accessed once the credentials are verified, therefore before the credentials are verified, the protected file is totally protected and inaccessible. Therefore, the reference file should contain the method to call the Web Service hosted in the cloud to verify the computer credentials. The method should be encapsulated in the reference file.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method for protecting access to a computer file, comprising:
   a user, employing a user computer, selecting a file on the user computer to be protected; and
   protecting access to the selected file, including
   creating a reference file for the protected file; and
   using the reference file to control access to the protected file, including, when a requester uses a computer device to request access to the protected file, the reference file initiating a procedure to determine if the computing device is entitled to access the protected file by validating a series of computer components that uniquely identify the computing device; and wherein:

the protecting access to the selected file includes storing a set of specified computer configuration data in a specified storage location; and the validating the series of computer components that uniquely identify the computing device includes comparing said set of specified computer configuration data with the series of computer components that uniquely identify the computing device; and the set of specified configuration data identifies a set of computers, whereby access to the protected file is granted when the attempt to access the protected file comes from any computer of, and only computers of, said set of computers.

2. The method according to claim 1, wherein the set of specified computer configuration data includes hardware configuration data and software configuration data.

3. The method according to claim 1, wherein the protecting access to the selected file includes storing the selected file in a specified location on the user computer.

4. The method according to claim 3, wherein the user computer has an operating system, and the protecting the selected file includes encapsulating the protected file on the user computer to restrict access to the protected file from said operating system.

5. The method according to claim 1, wherein the using the reference file to control access to the protected file includes giving the requester access to the protected file only when the reference file initiating the procedure to determine if the computing device is entitled to access the protected file by validating the series of computer components that uniquely identify the computing device.

6. The method according to claim 1, wherein when said procedure determines that the computing device is not entitled to access the protected file, requesting that said person provide a defined security token to have access granted to the protected file.

7. A system for protecting access to a computer file, comprising:

a user computer including an administrative console for selecting a file to be protected, and for protecting access to the selected file, including creating a reference file for the protected file; and using the reference file to control access to the protected file, including, when a requester uses a computer device to request access to the protected file, the reference file initiating a procedure to determine if the computing device is entitled to access the protected file by validating a series of computer components that uniquely identify the computing device; and a storage device remote from the user computer for storing a set of specified computer configuration data; and wherein:

said validating the series of computer components that uniquely identify the computing device includes comparing said set of specified computer configuration data with the series of computer components that uniquely identify the computing device; and the set of specified configuration data identifies a set of computers, whereby access to the protected file is granted when the attempt to access the protected file comes from any computer of, and only computers of, said set of computers.

8. The system according to claim 7, wherein:

the user computer includes an operating system;

the protected file is stored on the user computer; and the protected file is encapsulated on the user computer to restrict access to the protected file from said operating system.

9. A computer program product comprising:

a computer readable device having computer program code tangibly embodied therein for protecting access to a computer file, the computer program code, when executed in a computer system, performing the following:

receiving input from a user on a user computer to select a file to be protected; and protecting the selected file, including creating a reference file for the protected file; and using the reference file to control access to the protected file, including, when a requester uses a computer device to request access to the selected file, the reference file initiating a procedure to determine if the computing device is entitled to access the selected file by validating a series of computer components that uniquely identify the computing device; and wherein:

the protecting access to the selected file includes storing a set of specified computer configuration data in a specified storage location;

the validating the series of computer components that uniquely identify the computing device includes comparing said set of specified computer configuration data with the series of computer components that uniquely identify the computing device;

the set of specified configuration data identifies only the user computer, whereby access is granted to the protected file only when the attempt to access the protected file comes from the user computer; and the set of specified configuration data identifies a set of computers, whereby access to the protected file is granted when the attempt to access the protected file comes from any computer of, and only computers of, said set of computers.

* * * * *